April 26, 1955
J. H. LITTLE ET AL
2,707,079
HEATER AND DEFROSTER CONTROL MECHANISM
Filed June 9, 1951
3 Sheets-Sheet 1
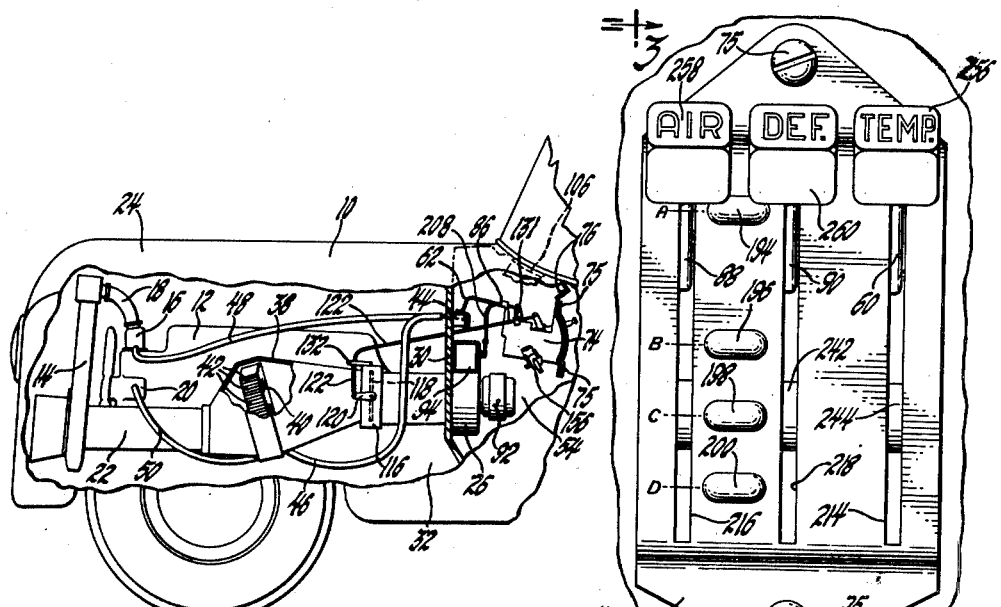
Inventors
John H. Little &
Harold J. Schoelles
By Willits, Helmig & Baillio
Attorneys April 26, 1955
J. H. LITTLE ET AL
2,707,079
HEATER AND DEFROSTER CONTROL MECHANISM
Filed June 9, 1951
3 Sheets-Sheet 2
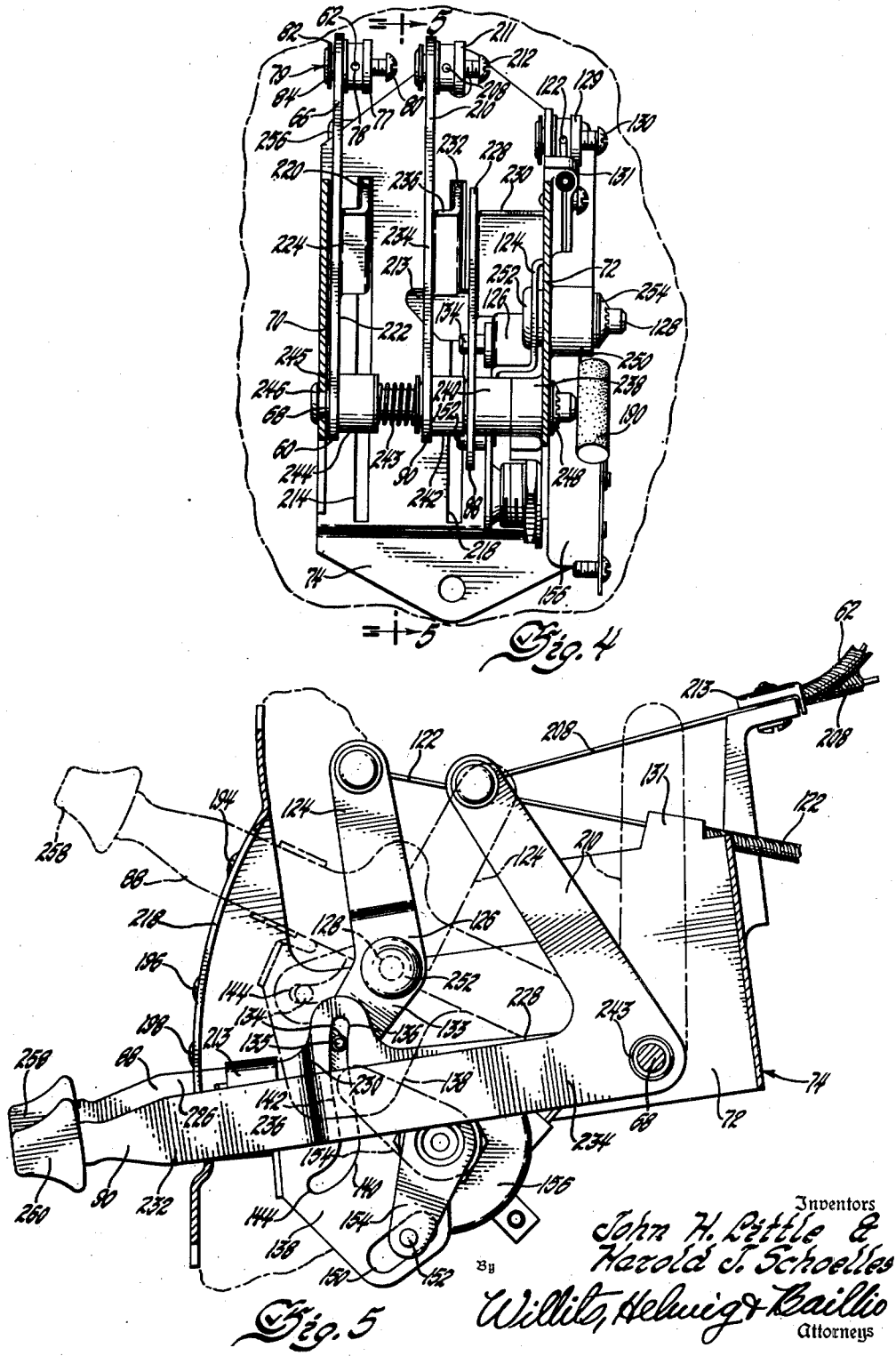

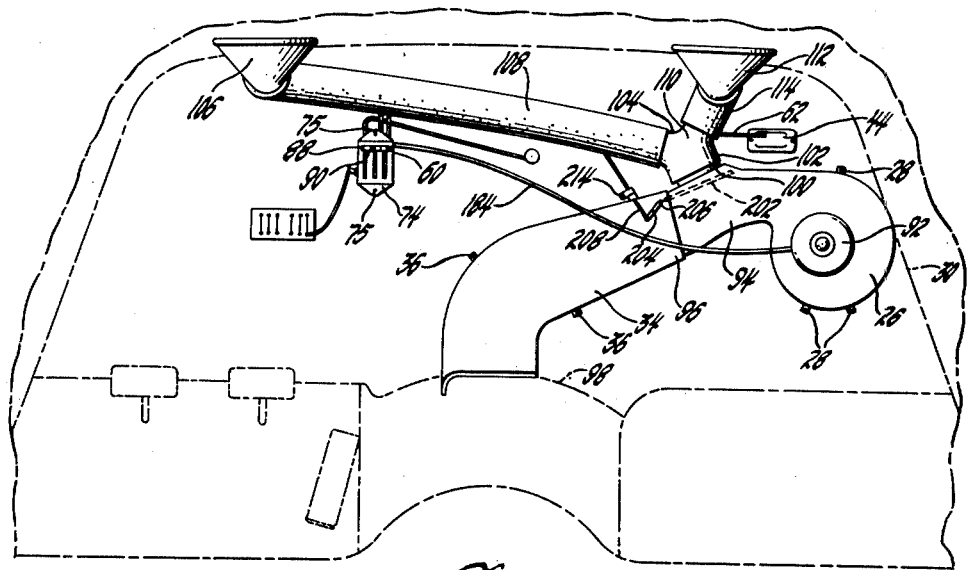
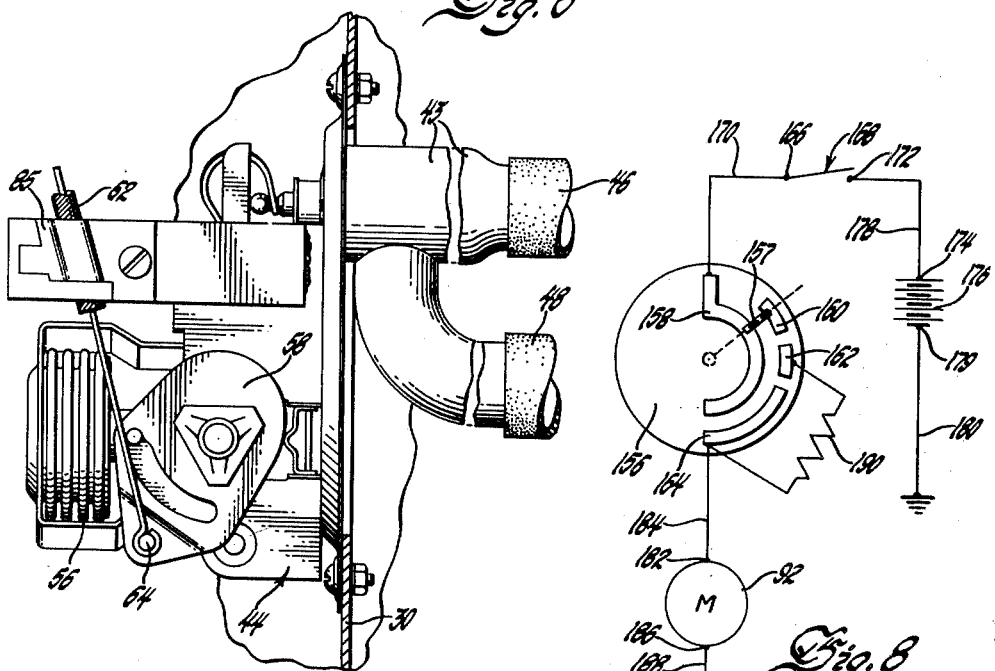

United States Patent Office 2,707,079
Patented Apr. 26, 1955

2,707,079

HEATER AND DEFROSTER CONTROL MECHANISM

John H. Little, Huntington Woods, Mich., and Harold J. Schoelles, Lockport, N. Y., assignors to General Motors Corporation, Detroit, Mich., a corporation of Delaware Application June 9, 1951, Serial No. 230,832

14 Claims. (Cl. 237—8)

This invention relates to heating and windshield defrosting systems for motor vehicles and more particularly to the control mechanisms associated with such systems.

In systems of the static character it is desirable to provide manual means for adjusting the main air control valve provided in the air inlet duct thereof to regulate the quantity of air flowing to the associated air distributor and also to start, stop and regulate the speed of operation of the associated fan or blower. Manually operable valve means also are usually mounted in the air distributor to control the air flow for heating purposes and also for defogging or defrosting the windshield. In some cases additional control means are also provided for adjusting the thermostat associated with the heating unit for the heating and defrosting systems in order to predetermine the temperature at which the valve controlling the flow of hot water to said unit will open or close. In prior systems of this type, the different control means associated therewith were operable independently of each other and, consequently, the control means for the defroster might be actuated while the valve in the air inlet duct is closed and also while the blower motor is at rest and as a result no air would be supplied for defrosting purposes.

One object of the present invention is to provide novel and highly useful control mechanisms for vehicle heating and windshield defrosting systems which are so constructed and arranged as to compel opening of the valve in the inlet air duct of the system when the defroster control means is adjusted toward windshield defrosting position.

Another object is to provide control mechanism for vehicle heating and windshield defrosting systems which is so arranged as to compel operation of the associated blower when the defroster control means is operated to certain windshield defrosting positions.

A further object is to provide control mechanisms for vehicle heating and windshield defrosting systems which compel opening of the valve in the air inlet duct thereof when the defroster control means is adjusted to one position and to compel operation of the blower in the system when moved to other positions of adjustment.

A still further object is to provide in a heating and defrosting system for motor vehicle, a series of control levers, one for controlling the inlet air and also the operation of the system blower, a second for controlling the flow of air for defrosting purposes and a third for controlling the temperature of the air in vehicle passenger compartment, said levers being so constructed and arranged that movement of said second lever compels movement of said first mentioned lever.

A still further object is to provide a heating and windshield defrosting system of the stated character which is simple in construction, economic in manufacture and highly efficient in operation.

Other and further objects will become apparent as the description of the invention progresses.

Of the drawings:

Fig. 1 is a side elevational view of the front portion of a motor vehicle showing the vehicle heating and windshield defrosting apparatus and the control mechanism incorporating the present invention associated therewith, certain parts being shown in section and parts of the vehicle being broken away to more clearly show the construction of said apparatus and control mechanism.

Fig. 2 is a fragmentary elevational view showing the control levers for controlling the operation of the heating and windshield defrosting system and the bracket mounting therefor.

Fig. 3 is a side elevational view of the control mechanism taken substantially along line 3—3 of Fig. 2.

Fig. 4 is an elevational view, partly in section, taken substantially along line 4—4 of Fig. 3.

Fig. 5 is a side elevational view, partly in section, taken substantially along line 5—5 of Fig. 4.

Fig. 6 is an elevational view looking toward the front of the vehicle from the interior thereof showing the various elements of the heating and defrosting apparatus and the control mechanism therefor.

Fig. 7 is a fragmentary side view of the adjustable thermostatically controlled valve unit associated with the heating and defrosting system, and Fig. 8 is a wiring diagram of the electric circuit including the motor for operating the blower of the system and the associated control switch.

Referring to the drawings the numeral 10 designates the front end of a motor vehicle which has mounted therein in the usual manner an internal combustion engine 12. Water for cooling engine 12 may flow from the upper end thereof to the radiator 14 through a pipe fitting 16 mounted at the front end of said engine and a flexible hose connection 18 and be returned to the lower end of said engine through pipe connections (not shown). A circulating pump 20 is provided to assist the natural circulation of the cooling water, as is well known in the art. A thermostatically controlled valve for preventing the water in engine 12 from circulating through radiator 14 until the temperature thereof reaches a predetermined value is usually mounted in fitting 16.

An air inlet duct 22 is provided beneath the hood 24 of the vehicle through which fresh air may pass to the inlet end of a blower 26 secured in any suitable manner, such as by screws 28, to the passenger side of the dash panel or fire wall 30 of the vehicle 10. Duct 22 is disposed along one side of engine compartment 32 in substantial alignment with the blower 26. A distributor 34 is connected to the discharge end of blower 26 and also is secured to the passenger side of wall 30 by bolts 36 or other suitable means. Duct 22 has an enlarged portion 38 provided intermediate its ends in which is mounted in any suitable manner a radiator or heat exchanger 40. Heat exchanger 40 comprises finned tubes 42 which lie in the path of the air flowing through duct 22. The water inlet end of heat exchanger 40 is connected to a fitting 43 associated with an adjustable, thermostatically controlled valve unit 44 by a pipe connection 46, fitting 43 in turn being connected to engine 12 by a pipe connection 48. The outlet end of heat exchanger 40 is connected to circulating pump 20 by a pipe connection 50.

The flow of water through fitting 43 is controlled by a thermostatically operable valve (not shown) which in turn is controlled by the ambient air temperature in the passenger compartment 54 of the vehicle. When the temperature of the air in the passenger compartment falls below a predetermined value, the valve in fitting 43 opens, thereby permitting hot water from the engine to flow to heat exchanger 40 through pipe connection 48, fitting 43 and pipe connection 46 and thence back to the engine through pipe connection 50 and circulating pump 20. The air coming in contact with heat exchanger 40 is thus effectively heated for car heating and windshield defrosting purposes.

The thermostat 56 of unit 44 may be adjusted to different positions so that the temperature in passenger compartment 54 of the vehicle 10 may be maintained at the desired value. As shown in Fig. 7, valve unit 44 has pivotally mounted thereon a cam member 58 which is movable to different positions to condition the operating means for the valve thereof for operation at different predetermined ambient air temperatures in passenger compartment 54. Adjustable thermostatically controlled valves of this type are old in the art and, accordingly, a detailed description thereof will not be given herein. For a complete description of such a device reference may be had to the copending application of Arthur J. Schutt, Serial No. 125,029, filed November 2, 1949, now Patent No. 2,663,499, for Temperature Control Valves. Suffice it to say that upon adjustment of cam 58 by mechanism which will presently be described, the valve in unit 44 will be operated in accordance with the temperature in compartment 54 corresponding to such adjustment of said cam.

Cam 58 is actuated to its different positions of adjustment by means of a bell crank lever 60 through the medium of a Bowden cable 62 which is attached at one end thereof to a stud 64 secured to and extending laterally of said cam. The other end of cable 62 is secured to the substantially vertical arm 66 of lever 60. As shown more particularly in Figs. 1 and 4 lever 60 is pivotally supported on a rod 68 mounted in the side walls 70 and 72 of a bracket 74 secured in any suitable manner, such as by bolts 75, to the instrument panel 76 of the vehicle 10. Any suitable means may be provided for securing cable 62 to arm 66. As shown in Fig. 4, a collar 77 having a cable receiving opening 78 extending therethrough is rotatably mounted on a rivet 79 provided in an opening at the upper end of arm 66. Collar 77 is provided with an internally threaded bore centrally thereof for receiving a set screw 80. After the cable 62 has been inserted through opening 78, the set screw is turned causing the inner end of the latter to bindingly engage the said cable and thereby effectively secure it to arm 66. A washer 82 is disposed between the head 84 of rivet 79 and arm 66 to hold the parts against lateral displacement in one direction. The collar 77 engages the other side of arm 66 to hold the parts against lateral movement in the opposite direction. The cable 62 is supported by clamp brackets 85 and 86 secured to and extending outwardly from the casing of valve unit 44 and the inner end of bracket 74 as shown in Figs. 1 and 7.

Also pivotally supported on rod 68 are an air control lever 88 and a defrosting control bell crank lever 90 the structure and operation of which will be described more fully later herein.

Blower 26 is driven by any suitable power means such as an electric motor 92. The discharge end 94 of blower 26 is connected to the inlet end 96 of air distributor 34 which conducts the air to the portion of the floor 98 of the vehicle disposed between the driver and passenger seats thereof, as shown more clearly in Fig. 6. The upper surface of the discharge end 94 of the blower 26 is provided with a defroster take-off opening 100 having a Y-fitting 102 connected thereto. Branch 104 of fitting 102 is connetced to a defroster air discharge fitting 106 secured to the instrument panel 76 in front of the driver's side of the vehicle by a flexible hose connection 108. The other branch 110 of fitting 102, likewise, is connected to a second defroster air discharge fitting 112 secured to the instrument panel in front of the passenger side of the vehicle by a flexible hose connection 114.

The portion 16 of duct 22 disposed between enlarged portion 38 and the inlet end of blower 26 has pivotally mounted therein valve 118. An arm 120 is operatively connected to valve 118 and has attached to the outer end thereof one end of a Bowden cable 122. The other end of cable 122 is secured to the upwardly extending arm 124 of a two-arm lever 126 pivotally mounted on a stud 128 attached to side wall 72 of bracket 74. Cable 122 may be secured to arm 124 by a means of an apertured collar 129 and a set screw 130 similar to the collar 77 and set screw 80, respectively, associated with Bowden cable 62. Bowden cable 122 is supported in clamp brackets 131 and 132 secured to bracket 74 and portion 116 of duct 22, respectively, as shown in Fig. 1. The lower end of the downwardly extending arm 133 of lever 126 has an anti-friction roller 134 rotatably mounted on a stud 135 secured to said arm, said roller extending into the cam slot 136 provided in the enlarged central portion 138 of lever 88. Cam slot 136 is provided with a camming portion 140 and a concentric holding portion 142, as shown more particularly in Fig. 5. When lever 88 is in its upper position indicated at A on the index and guide plate 143 of bracket 74, as shown by broken lines in Fig. 5, roller 134 is disposed at the lower end 144 of cam slot 136. In this position valve 118 is in its closed position of adjustment, as shown in Fig. 1, in which position no air flows through duct 22 to blower 26. Upon movement of lever 88 to the position indicated at B, cam 140 will have actuated lever 126 in a counterclockwise direction sufficiently to effect actuation of damper 118 to fully open position. Upon further movement of lever 88 roller 134 will simply ride in the concentric portion 142 of slot 136 and, consequently, no further movement will be imparted to lever 136 or to valve 118 until lever 88 is again moved upwardly toward the broken line position shown in Fig. 5 when the valve 118 will have been actuated to its closed position.

The enlarged portion 138 of lever 88 has provided therein a second cam slot 150 for receiving a stud 152 secured to and extending laterally from the lower end of an arm 154. Arm 154 is adapted to actuate an electric switch 156 secured in any suitable manner to the lower end of side wall 72 of bracket 74. As shown in Fig. 8, switch 156 comprises a movable contact element 157 and fixed contact elements 158, 160, 162, and 164, the said movable contact being connected for simultaneous movement with arm 154. One end of contact element 158 is connected to the terminal 166 of a single poll ignition or other control switch 168 by a conductor 170. The contact terminal 172 of switch 168 is connected to the terminal 174 of a storage battery 176 by a conductor 178. The other terminal 179 of battery 176 is connected to ground by a conductor 180. It will also be observed that one end of contact element 164 is connected to the terminal 182 of electric motor 92 by a conductor 184, the other terminal 186 of said motor being connected to ground by a conductor 188. Contact element 162 and the end of contact element 164 are connected by a resistance coil 190. The various elements of switch 156 are disposed in the position shown in Fig. 8 when lever 88 is in its uppermost position of adjustment shown in Figs. 2 and 3. In this position of lever 88, the circuit to motor 92 is interrupted. When lever 88 moves from the position shown in Figs. 2 and 3 to the position indicated at B on plate 143 valve 118 will have been moved from the closed position shown in Fig. 1 to fully open position. Contact element 157 also will have been moved by arm 154 toward fixed contact 162 but not sufficiently to engage the latter. Upon movement of lever 88 to the position indicated at C on plate 143 contact element 157 will have been actuated by arm 154 sufficiently to cause bridging of contact elements 158 and 162, thereby completing the circuit to the motor 92 through resistance 190. Blower 26 is now operated by motor 92 at a relatively slow speed, due to resistance 190 in the circuit, causing a corresponding volume of air to be drawn through duct 22. Now, upon actuation of lever 88 to the position indicated at D on plate 143, contact element 156 will have been moved by arm 154 sufficiently to bridge contact elements 158 and 164. The resistance 190 is now cut out and accordingly the speed of motor 92 will be correspondingly increased. The blower 26 will consequently be driven at a higher rate of speed thereby increasing the amount of air flowing through the system. As shown more clearly in Fig. 3, a lever 88 has secured thereto a spring arm 192 having a detent 193 formed thereon which is adapted to extend into any of the depressions, 194, 196, 198 or 200 provided in index plate 143 which depressions correspond, respectively, with the positions A, B, C, and D of said lever just described. Detent 193, thus resiliently holds lever 88 in its different positions of adjustment.

As shown more particularly in Figs. 1 and 6 the inlet end 96 of distributor 34 has pivotally mounted therein a valve 202 which is adapted for actuation to different positions of adjustment by lever 90. An arm 204 is operatively connected to valve 202 as shown at 206 and has attached to the outer end thereof, by any suitable means, one end of a Bowden cable 208. The other end of cable 208 is secured to the upper end of the substantially vertical arm 210 of the bell crank lever 90. Cable 208 is secured to arm 210 by an apertured collar 211 and a set screw 212 similar to the collars and set screws for attaching cables 62 and 122 to their respective levers 60 and 126. Cable 208 is supported on clamp brackets 213 and 214 secured to bracket 74 and distributor 34, respectively, as shown in Figs. 3, 5 and 6. When lever 90 is in its uppermost position of adjustment, as shown in Fig. 2, valve 202 is in fully open position and consequently all of the air flowing in the system will be directed to distributor 34, from which it discharges into the passenger compartment 54 of the vehicle for heating or ventilating purposes. In this position of valve 202, the take-off opening 100 is closed and consequently no air is directed to fitting 106 or 112 for discharge against the windshield.

In order to insure opening of valve 118 in duct 22 when lever 90 is moved to its initial downward position of adjustment and to cause energization of electric motor 92 when said lever moves to other of its positions of adjustment, lever 88 is provided with an arm 213 which underlies lever 90. Consequently, upon actuation of lever 90, lever 88 will be moved correspondingly to first cause opening of valve 118 and upon further movement thereof to then effect closing of switch 156 to energize electric motor 92, as previously described.

As shown more particularly in Fig. 2, plate 143 of bracket 74 is provided with guide slots 214, 216, and 218 therein through which extend, respectively, the outer ends of levers 60, 88, and 90. Lever 60, it will be observed, is provided with offset outer and inner portions 220 and 222 connected by a transverse portion 224. Lever 88 is likewise provided with offset outer and inner portions 226 and 228 connected by transverse portion 230. Lever 90 is similarly provided with offset outer and inner portions 232 and 234 connected by a transverse portion 236. By this construction the outer portions of the levers 60, 88 and 90 are disposed at substantially equal distances apart.

Sidewall 72 of bracket 74 is provided with an enlarged inwardly extending boss 238 through which supporting rod 68 extends. A spacing washer 240 is provided between the enlarged intermediate portion 138 of lever 88 and the inner surface of boss 238. A similar spacing washer 242 is disposed between the inner ends of levers 88 and 90. A coil spring 243 surrounds rod 68 and extends between the inner end of lever 90 and a spacing washer 244 which in turn engages the inner surface of lever 60. A relatively thin washer 245 is provided between lever 60 and wall 70 of bracket 74. When the parts are assembled as shown in Fig. 4, the spring 243 is placed under tension and consequently friction is produced between walls 70 and 72 of bracket 74, the spacing washers 240, 242, 244 and 245 and the levers 60, 88 and 90. As a result, levers 60, 88 and 90 will remain in their different positions of adjustment. Lever 88 is also held in its different positions of adjustment by means of holding detent 193, as previously described. Rod 68 is held against lateral movement in one direction by the head 246 provided at one end thereof and against movement in the opposite direction by a Tinnerman nut 248. The stud 128 upon which lever 124 is pivotally mounted extends through an enlarged boss 250 formed on the sidewall 72 of bracket 74 and is held against lateral movement in one direction by the head 252 provided thereon and against movement in the opposite direction by a Tinnerman nut 254.

Lever 60 has provided at the outer end thereof a handle 256 bearing the legend TEMP. designating temperature. Lever 88 has provided at the outer end thereof a handle 258 having the legend AIR provided thereon designating control of the air flow. Lever 90 likewise has mounted at the outer end thereof a handle 260 having the legend DEF provided thereon designating defrosting.

As shown in Figs. 1 and 6, the bracket 74 in which the levers 60, 88 and 90 are mounted is positioned on the instrument panel 76 in such a manner that the said levers may be readily manipulated by the driver of the vehicle.

From the foregoing description it is seen that a highly improved vehicle heating and windshield defrosting system has been provided. By simply manipulating lever 60 the thermostat associated with the heating and defrosting unit may be adjusted so as to insure the desired temperature conditions in passenger compartment of the vehicle. It is also seen that lever 88 may be adjusted to control the air flow through the system and to control the operation of the blower 26. By manipulation of lever 90 the air discharging into blower 26 from duct 22 may be aportioned between distributor 34 and windshield air-directing fittings 106 and 112. By so manipulating lever 90 all of the air may be utilized for windshield defrosting purposes or only a portion thereof may be so used, depending upon the position of adjustment of valve 202. It is also seen that by virtue of the interconnection between levers 88 and 90, upon operation of defrosting lever 90 the main valve 118 in duct 22 will be opened simultaneously with the movement of valve 202 to uncover the defroster take-off opening 100, thereby assuring the flow of air to the windshield for defrosting purposes. When greater amounts of air are required for defrosting the windshield the lever 90 is moved downwardly to a greater extent which movement not only causes energization of the blower motor 92, thereby inducing a greater air flow in the system but moves valve 202 to partially or completely shut off the air flow to the distributor 34 and thus cause a greater amount of air to be directed against the windshield causing rapid defrosting thereof.

While but a single embodiment of the invention has been shown and described herein, it is apparent that the device is subject to modification and change without departing from the invention. It therefore is to be understood that it is not intended to limit the invention to the single embodiment disclosed but only by the scope of the claims which follow.

What is claimed is:

1. In a vehicle heating and windshield defrosting system, the combination of air conducting and distributing means having a discharge opening therein through which air may pass for vehicle heating and ventilating purposes and a windshield defrosting take-off opening, a valve for controlling the air flow in said means, adjusting means for said valve, a second valve normally covering said take-off opening and permitting substantially free air flow to said discharge opening and adapted for movement to uncover said take-off opening and to progressively shut off the air flow to said discharge opening, adjusting means for said second valve, and means compelling operation of said first mentioned adjusting means to open said first mentioned valve upon operation of said second mentioned adjusting means to uncover said take-off opening.

2. In a heating and windshield defrosting system, the combination of a blower having a discharge opening through which air may pass for vehicle heating and ventilating purposes and a windshield defrosting take-off opening, an electric motor for driving said blower, a switch for controlling the speed of said motor, adjusting means for said switch to regulate the speed of said motor a valve normally closing said take-off opening and opening said discharge opening and adapted for movement to uncover said take-off opening and to progressively close said discharge opening, adjusting means for said valve movable to different positions of adjustment, and means compelling actuation of said switch adjusting means upon movement of said valve adjusting means to certain positions of adjustment.

3. In a vehicle heating and windshield defrosting system, the combination of an air inlet duct, a blower operatively connected to said duct having an air discharge end and a windshield defrosting take-off opening near said discharge end, a distributing duct connected to said discharge end adapted to conduct air to the interior of said vehicle for heating and defrosting purposes, a valve in said inlet duct for controlling the flow of air in said system, adjusting means for said valve, a second valve normally closing said take-off opening and permitting free air flow to said distributor, said last mentioned valve being movable to uncover said take-off opening and to progressively close said discharge end, and means compelling actuation of said first mentioned valve adjusting means upon movement of said second mentioned valve adjusting means to uncover said take-off opening.

4. In a vehicle heating and windshield defrosting system, the combination of an air inlet duct, a blower operatively connected to said duct having an air discharge end and an air outlet opening near said discharge end a distributor connected to the discharge end of said blower adapted to conduct air to the interior of said vehicle, a windshield, air directing means disposed adjacent said windshield, conduit means connecting said air outlet opening to said air directing means, a valve mounted in said inlet duct for controlling the air flow to said blower, means for adjusting said valve, a second valve for controlling the air flow from said blower to said distributor and to said air directing means, means for adjusting said second mentioned valve to apportion the air between said distributor and said air directing means, and inter-engaging means between said first and second mentioned valve adjusting means to compel operation of the former upon operation of the latter in one direction.

5. In a vehicle heating and windshield defrosting system, the combination of air conducting means, air heating means mounted in said air conducting means, a valve in said air conducting means, means for adjusting said valve to open and closed position, a blower operatively connected to said air conducting means having an air discharge end and a windshield defrosting take-off opening near said discharge end, duct means connected to the said discharge end of said blower for conducting air into the interior of said vehicle, a windshield, air directing means disposed adjacent said windshield for directing air over the surface of the latter, means connecting said air directing means to said take-off opening, a valve in said duct means for controlling the flow of air to said air directing means, means for adjusting said last mentioned valve, thermostatically controlled valve means for controlling said air heating means, means for adjusting said last mentioned means, and means operatively connecting said second mentioned valve adjusting means to said first valve adjusting means when the former moves in one direction to thereby effect adjustment of both said first and second mentioned valves.

6. In a device of the class described, the combination of vehicle heating means, comprising, an air duct, an air heating unit in said duct, a valve for controlling the air flow in said duct, manual adjusting means for said valve, windshield defrosting means operably connected to said duct, a valve for controlling the air flow to said defrosting means, a second manual means for adjusting said last mentioned valve, and an interlock between said first and second manual adjusting means for compelling operation of the former upon movement of the latter in one direction.

7. In a vehicle heating and windshield defrosting system, the combination of air conducting and defrosting means having a defroster take-off opening provided therein, a valve provided in said means for controlling the flow of air therethrough, a second valve for controlling the air flow to said take-off opening, a supporting bracket, a control lever pivotally mounted on said bracket, means operatively connecting said lever to said first mentioned valve, a second lever pivotally mounted on said bracket means operatively connecting said second lever to said second mentioned valve, and an arm secured to and extending laterally of said first mentioned lever and adapted to be engaged by said second lever when the latter moves in one direction whereby both of said valves are adjusted when said second lever moves in said one direction.

8. A control mechanism, comprising, a supporting bracket including spaced side walls, a supporting rod mounted in said bracket, a plurality of control levers pivotally mounted on said rod, a guide plate having a series of guide slots therein, one for each of said levers secured to said bracket and extending between side walls, an arm secured to and extending laterally of one of said levers and into the path of movement of another of said levers when the latter moves in one direction, whereby upon movement of said last mentioned lever in said one direction both of said last mentioned levers move in said one direction, said guide plate having a series of spaced depressions therein, a spring detent carried by one of said levers adapted to enter any of said depressions to hold said last mentioned lever in adjusted position, spacing means mounted on said rod and disposed between said levers and said side walls, and resilient means mounted on said rod for urging said levers into engagement with said spacing means, whereby said levers are frictionally retained in adjusted positions.

9. A control mechanism for vehicle heating and windshield defrosting systems, comprising, a supporting bracket, a pair of manually operable levers mounted in said bracket in side by side relation, an arm secured to and extending laterally of one of said levers and lying in the path of movement of other of said levers when the latter moves in one direction, whereby both of said levers are adapted for movement together in said one direction upon movement of said other lever in said one direction, a third lever pivotally mounted in said bracket, cam means actuated by one of said first mentioned levers for actuating said third lever, a switch mounted on said bracket, an operating arm operatively connected to said switch, and additional cam means on the said one of said first mentioned levers for actuating said arm.

10. A control mechanism, comprising, a supporting bracket including a pair of spaced side walls, a supporting rod mounted in said bracket, a control lever pivotally mounted on said rod having a pair of cam slots provided therein, a second control lever pivotally mounted on said rod, an arm secured to and extending laterally of said first mentioned control lever and adapted to be engaged by said second lever when the latter moves in one direction, a third lever pivotally mounted in said bracket, a cam follower provided on said third lever and extending into one of said cam slots in said first mentioned lever for actuation thereby, a switch secured to said bracket, an operating arm for said switch, and a cam follower carried by said last mentioned arm extending into the other of said cam slots in said first mentioned lever for actuation thereby.

11. In a vehicle heating and windshield defrosting system, the combination of air conducting and distributing means having a defroster take-off opening provided therein, an instrument supporting panel, and a control mechanism for said system, comprising, a valve provided in said means for controlling the flow of air therethrough, a second valve for controlling the air flow to said take-off opening, a bracket mounted on said panel, a control lever pivotally mounted on said bracket, means operatively connecting said lever to said first mentioned valve, a second lever pivotally mounted on said bracket, means operatively connecting said second lever to said second mentioned valve, an arm secured to and extending laterally of said first mentioned lever and adapted to be engaged by said second lever when the latter moves in one direction, whereby both the said valves will be actuated when said second lever moves in said one direction, guide means for said levers provided on said bracket, and interengaging means on one of said levers and said guide plate for holding said lever in different positions of adjustment.

12. In a vehicle heating and windshield defrosting system, the combination of an air inlet duct, an air distributing duct, a blower for inducing air flow through said ducts having a windshield defrosting take-off opening provided therein, and a control mechanism for said system, comprising, a valve mounted in said inlet duct for controlling the air flow in said system, a second valve in said distributing duct for controlling the air flow to the latter and to said take-off opening, a supporting bracket, a control lever pivotally mounted in said bracket, means operatively connecting said lever to first said mentioned valve, a second lever pivotally supported in said bracket, means connecting said second lever with second mentioned valve, and interengaging means between said first and second levers compelling operation of said first lever upon operation of said second lever in one direction.

13. In a vehicle heating and windshield defrosting system, the combination of an air inlet duct, an air distributing duct, a blower for inducing air flow through said ducts having a windshield defrosting take-off opening provided therein, an electric motor for driving said blower, and a control mechanism for said system, comprising, a valve mounted in said inlet duct for controlling the air flow in said system, a second valve in said distributing duct for controlling the air flow to the latter and to said take-off opening, a supporting bracket, a switch mounted on said bracket for controlling the operation of said electric motor, a supporting rod mounted in said bracket, a control lever pivotally mounted on said rod having a pair of cam means associated therewith, a second lever, means for pivotally mounting said second lever on said bracket, means connecting said second lever to said first mentioned valve, a cam follower carried by said second lever engaging one of the cam means, an operating arm for said switch, a cam follower carried by said arm and engaging the other of said cam means, a third lever pivotally mounted in said bracket, means operatively connecting said last mentioned lever to said second mentioned valve, and interengaging means between said first and third levers for compelling operation of said first lever upon operation of said third lever in one direction.

14. In a vehicle heating and windshield defrosting system, the combination of an air inlet duct, an air distributing duct, a blower for inducing air flow through said ducts having a windshield defrosting take-off opening provided therein, an electric motor for driving said blower, and a control mechanism for said system, comprising, a valve mounted in said inlet duct for controlling the air flow in said system, a second valve mounted in said distributing duct for controlling the air flow to the latter and to said take-off opening, a heating unit mounted in said inlet duct, adjustable thermostatically controlled valve means for controlling said heating unit, a supporting bracket, a switch mounted on said bracket for controlling said electric motor, a supporting rod mounted in said bracket, a control lever pivotally mounted on said rod having a pair of cam slots provided therein, a second control lever mounted on said rod, a third control lever mounted on said rod, a fourth lever pivotally mounted in said bracket, means connecting said fourth lever with said first-mentioned valve, a cam follower carried by said fourth lever extending into one of said cam slots, an operating arm for said switch, a cam follower carried by said arm extending into the other of said cam slots, means connecting said second lever with said second-mentioned valve, interlocking means between said first and second mentioned levers compelling operation of said first lever upon operation of the said second lever in one direction, means operatively connecting said third lever with said thermostatically controlled valve means whereby the latter may be adjusted by said third lever, a guiding plate for said first, second and third levers mounted on said bracket, and means for retaining said levers in different positions of adjustment.

References Cited in the file of this patent

UNITED STATES PATENTS

| | | |
|---|---|---|
| 1,013,424 | Murphy | Jan. 2, 1912 |
| 1,196,976 | Pembroke | Sept. 5, 1916 |
| 2,226,510 | Grant | Dec. 24, 1940 |
| 2,306,796 | Staley | Dec. 29, 1942 |
| 2,445,392 | Findley | July 20, 1948 |
| 2,447,469 | Spraragen | Aug. 17, 1948 |
| 2,488,278 | Findley | Nov. 15, 1949 |
| 2,507,767 | Castor | May 16, 1950 |
| 2,579,959 | Petersen | Dec. 25, 1951 |